United States Patent [19]
Kolganov et al.

[11] Patent Number: 4,818,281
[45] Date of Patent: Apr. 4, 1989

[54] METHOD OF MELTING IN AN OXYGEN CONVERTER

[75] Inventors: Gennady S. Kolganov; Stanislav S. Volkov; Jury A. Rudnev; Vladimir G. Mizin; Evgeny N. Ivashina, all of Tula, U.S.S.R.

[73] Assignee: Nauchno-Proizvodstvennoe Obiedinenie "Tulachermet", Tula, U.S.S.R.

[21] Appl. No.: 127,211

[22] Filed: Dec. 1, 1987

[51] Int. Cl.$^4$ .............................................. C21C 7/00
[52] U.S. Cl. ..................................... 75/51.5; 75/51.2; 75/51.6; 75/59.19
[58] Field of Search ...................... 75/51.5, 51.2, 51.6, 75/51.19

[56] References Cited
U.S. PATENT DOCUMENTS 4,329,171  5/1982  Robert ................................. 75/59.19
4,537,629  8/1985  Lazcano-Novarro ............... 75/51.2

Primary Examiner—Peter D. Rosenberg
Attorney, Agent, or Firm—Lilling & Greenspan

[57] ABSTRACT

A method of melting steel in an oxygen converter from solid metal iron-bearing materials includes the steps of loading these materials and their subsequent heating up to their melting through burning hydrocarbon and solid carbon-containing fuels in an oxygen-containing gas. Then, when the temperature of the melt is 1525°–1580° C. the oxidizing slag is removed from its surface and thereafter a solid iron is loaded into the bath in an amount of 2–5% of the original quantity of the solid metal iron-bearing materials.

2 Claims, No Drawings

METHOD OF MELTING IN AN OXYGEN CONVERTER

BACKGROUND OF THE INVENTION

The invention relates to metallurgy, and more particularly to a method of melting steel in an oxygen converter.

The invention may be used for production of steel in an oxygen converter from solid metal iron-bearing materials. Such solid metal iron-bearing materials (metal charge) might be, for example, scrap, crop ends, metal waste from steel plants, as well as metallized pellets, sponge iron, etc.

DESCRIPTION OF THE PRIOR ART

Known in the art is a method of steel production in an oxygen converter with usage of a solid metal charge (DE, C, 2719981, DE, C, 2729982, DE, C, 2729983).

To produce steel by such a method, the oxygen converter is equipped with bottom and side tuyeres of "pipe-in-pipe" type. Oxygen is injected through the central passage of these tuyeres and liquid or gaseous hydrocarbon fuel is supplied through exterior passages.

The converter is loaded with a solid metal charge which is first heated due to burning hydrocarbon fuel (gaseous or liquid) in an oxygen-containing gas which is injected through said tuyeres into the converter from bottom, and side (blowing). Being heated the solid metal charge is melted. When the charge is melted (the metal bath is formed) at the zones of the tuyeres, milled (pulverised) carbon-containing materials, such as coke, coal, graphite or their mixtures are loaded into the converter as an additional power carrier. The feed of the carbon-containing fuel is gradually reduced to a degree, which provides for the protection of the tuyeres from destruction, i.e. to 8–12% (by volume) of oxygen consumption.

When the solid metal charge is completely melted the metal bath is refined by any known in the art method similar to the process of blowing iron. Heating the bath is obtained mainly with heat released by the reaction of oxidation of carbon dissolving in iron. At the same period milled lime is also loaded into the bath together with oxygen for forming slag. When the metal has the required temperature it is tapped from the converter.

The above technique of steel production permits to use available carbon-containing materials, such as coke, coal, graphite and their mixtures. However, for their preparation and transportation to a converter it is necessary to install additional equipment, what results in increasing capital investments.

In the process of melting oxygen moving through the liquid metal in the zones of the tuyeres is partly consumed for oxidation of iron what results in increasing slag quantity and ferrous oxide (FeO) content in it. Ferrous oxide forms lightly fusing eutectics with materials of the refractory lining, wich being fused increase lining wear.

It is also known in the art "Method of production of steel in an oxygen converter" (International application SU 83/00025, 17.04.84).

This method is carried out in an oxygen converter, which is equipped with bottom and side tuyeres of "pipe-in-pipe" type. Oxygen is injected through a central passage of the tuyeres and liquid and gaseous hydrocarbons are injected through the exterior holes. It is also provided the possibility for oxygen injection through an upper water-cooled lance.

The methods includes the following technique processes: loading a solid metal charge, for example, metal scrap, with its subsequent heating and melting through burning hydrocarbon and solid carbon-containing fuel, charged successively during the process, in an oxygen-containing gas injected into the converter from bottom, top and side through said tuyeres. Then the carbonized iron melt is refined.

The hot combustion products moving from bottom to top heat the solid metal charge loaded in the converter. In the process of heating the solid metal charge an air enriched with oxygen is injected through said bottom tuyeres to burn the fuel. At the same time a pure oxygen is injected through a top lance and side tuyeres. Later in the process of melting and refining the carbonized iron melt the oxygen consumption in the oxygen-containing gas injected through the bottom tuyeres is increased to 100%.

This method based on varying an oxygen quantity in the oxygen-containing gas provides uniform heating of the solid metal charge and its subsequent thorough melting.

However, blowing the melt with an oxygen-containing gas during heating the solid metal charge and its melting results in forming a significant part of the slag of higher ferrous oxide (FeO) content. This is caused by oxidation of iron and coming iron oxides as rust into the bath together with iron-bearing materials. Ferrous oxide forms fusible eutectics with refractory lining materials, which are fused and thereby cause lining wear.

Besides, refining the carbonized iron melt under the slag of a higher ferrous oxide (FeO) content can cause metal and slag slopping from the converter, what tells negatively on the duration of the process.

SUMMARY OF THE INVENTION

It is an object of the present invention to provide a method of melting steel in an oxygen converter from solid metal iron-bearing materials, which would permit to reduce the duration of the melting process and decrease converter lining wear.

The object of the present invention is accomplished by providing a method of melting steel in an oxygen converter from solid metal iron-bearing materials, which comprises charging these materials and their subsequent heating to form a melt through burning successively loaded a hydrocarbon and solid carbon-containing fuel in an oxygen-containing gas fed into the converter from below, above and side, wherein, according to the present invention when the melt is of 1525°–1580° C. an oxidizing slag is removed from its surface and thereafter an iron is charged into the melt in an amount of 2–5% of its initial quantity of the metal iron-bearing materials.

Implementation of the present invention permits to control temperature and slag conditions of the melting. It creates possibility to decrease the duration of the melting process, i.e. to heat the bath quicker. This is due to higher degree of the post-combustion of carbon monoxide. The degree of the post-combustion of carbon monoxide in the exhausted gases of the converter, in the case if there is no liquid iron in the metal charge, increases with increasing ferrous oxide content in the slag. Increasing ferrous oxide content in the slag in the process of melting the charge and at the initial stage of heating the bath when its temperature is in the range of 1525°–1580° C. promotes to increasing the degree of post-combustion of carbon monoxide. Carbon monoxide burns out above the metal bath and significantly hastens melting the charge and heating the melt, thereby reducing the duration of the melting process.

However, with increasing the temperature of the melt over 1580° C. the higher degree of oxidation of the slag adversely affects the lining resistance because at a temperature over 1580° C. ferrous oxide forms lightly fusing eutectics with refractory lining materials, which being fused cause quick wear of the converter refractory lining.

For this reason it is necessary to remove the oxidizing slag from the surface of the melt at a temperature not higher than 1580° C. To remove the slag from the surface of the melt is possible at a temperature not lower than 1525° C., because to this end it is necessary to melt completely the charge, which has the melting point approximately 1525° C. At a temperature lower than 1525° C. to remove the oxidizing slag from the melt surface is impossible. In practical conditions for thorough melting the charge it is necessary to overheat it in relation to its melting point.

After removal of the oxidizing slag from the surface of the melt a small quantity of this slag is still in the bath. To deoxidize the slag remained in the melt it is necessary to feed therein deoxidizing materials. As a deoxidizing material in the present invention it is used a solid iron in an amount of 2–5 percent by mass of the metal charge.

The necessity to use solid iron is stipulated by the fact that carbon therefrom directly goes into the melt and reacting with the slag permits to reduce the ferrous oxide content remained therein, what decreases the converter refractory lining wear at further increasing the temperature. Said effect takes place due to highly developed interaction surface of the reacting phases, i.e. a metal and a slag.

Besides, carbon from solid iron goes directly into the melt and acts as an additional power carrier, what results in decreasing the duration of the melting process.

Usage of any other carbon-containing material (for example coal) instead of iron is less effective in this respect, because reaction of the slag bath with the solid material due to its low diffusion speed occurs with greatly lower speed, and, besides, is followed with slag foaming. For said above reasons to minimize oxidation of the slag it is necessary to add iron.

When a solid metal charge is used, an addition of solid iron in an amount of 5% of the total quantity of the metal charge permits to decrease the total content of ferrous oxide (FeO) in the slag to 15–20%, What is enough to provide the slag with the satisfactory refining ability and prevent from its foaming during the subsequent charging coal or any other carbon-containing material into the converter. Taking in mind the said above influence of solid iron additives to oxidation of the slag, its addition in an amount of more than 5% is not desirable. This is because with addition of more amount of iron the carbon content in the metal will significantly increase, what is not advisable as results in increasing the duration of the melting process. Addition of solid iron in an amount of less than 2% will not permit to reduce the ferrous oxide content to 20%, that is why the lower limit of quantity of solid iron additives is 2% of its initial quantity of the metal charge.

It is desirable after charging solid iron into the melt to add a solid carbon-containing fuel therein in an amount of 1–5% of the original quantity of solid metal iron-bearing materials.

Such additive permits to accelerate the process of bath heating due to burning carbon out of the carbon-containing fuel on the bath surface, what results in further decreasing the duration of the melting process.

Besides, this fuel acts as a deoxidizer for the oxidizing slag still remained in the bath because carbon therein reduces iron from ferrous oxides, what results in decreasing the wear of the converter refractory lining.

Consumption of the solid carbon-containing fuel, for example, coal, additionally loaded in the converter, according to the present invention is determined by values from 1 to 5%. The exact value of the additive depends on temperature of the melt after removal of the oxidizing slag, as well as on the required temperature at the end of the melting process, i.e. it depends on the required temperature increase. With the temperature increase from 1580° to 1600°–1610° C. 1% of coal is necessary, from 1580° to 1640°–1650° C.—2% of coal, from 1580° to 1680°–1700° C.—5% of coal.

DETAILED DESCRIPTION OF THE INVENTION

For a better understanding of the present invention the following specific examples are given below.

The method is implemented in an oxygen converter equipped with bottom and side tuyeres of the "pipe-in-pipe" type. Oxygen is injected through a central passage of these tuyeres and a hydrocarbon fuel is supplied through their exterior passages. The converter is also provided with facilities for injection of oxygen through an upper water-cooled lance.

The method of production of steel from solid metal iron-bearing materials, for example metal scrap, comprises the following.

As solid metal iron-bearing materials for steel making by this method the next materials can be used: scrap, crop ends, metal waste from steel plants, metallized pellets, sponge iron, etc.

As a fuel it is preferable to use gaseous hydrocarbons, such as natural gas, methane, propane, butane, as well as liquid hydrocarbons, such as residual oil, petroleum, diesel fuel. Also, as a fuel, it can be used a solid carbon-containing fuel, such as coke, coal, lignite, etc.

The process of making steel from solid carbon-containing materials in an oxygen converter comprises the periods of loading a charge into the converter, heating the charge, its melting, removal of the slag from the bath and subsequent oxidizing refining.

Heating the solid charge and its melting is done with heat released by burning the hydrocarbon fuel supplied through bottom and side tuyeres in an oxygen-containing gas injected through the same tuyeres, as well as through a top water-cooled lance.

During the periods of heating and melting the solid iron-bearing materials to maintain burning solid carbon-containing fuel is periodically loaded onto the metal charge. When the period of heating the charge goes into the period of its melting the oxygen rate in the oxygen-containing gas injected through the bottom tuyeres is increased from 20–70% up to approximately 100%. At the periods of charge melting and heating through the side tuyeres and the top water-cooled lance pure oxygen is injected.

When the charge is melted and its temperature is 1525°–1580° C. the oxidizing slag containing 30–70% of ferrous oxide, FeO, is removed from the bath surface.

After the oxidizing slag is removed from the surface of the bath, a solid iron and an additional coal is successively supplied therein in an amount of 2-5% and 1.5% of the total metal scrap mass respectively, and then the melt is refined.

Refining the carbonaceous iron melt is carried out by any known in the art methods, i.e. during the refining process a ratio of amounts of oxygen and hydrocarbons fed through the bottom tuyeres is controlled in such a way that hydrocarbons do not act as a fuel out as a protective medium for the oxygen lances. Steel is refined up to the required chemical composition and temperature.

The present invention is based on temperature and slag conditions control. Blowing the melt while the slag is highly oxidized (FeO=30-70%) is the period of melting the charge and at the initial stage of heating the melt when temperature of the bath is not higher than 1525°-1580° C. promotes to increasing the degree of the post-combustion of carbon monoxide. In the converter carbon monoxide burns above the metal bath and significantly promotes to hastening the process of melting the metal charge and heating the bath, what permits to decrease the duration of melting. At this period the oxidizing slag acts positively-the more quantity of the slag there is in the converter and higher its ferrous oxide content, the more intensive is the process of the carbon monoxide post-combustion. Besides, with increasing the temperature of the melt it is necessary to lower the degree of slag oxidation, i.e. to decrease the duration of interaction between ferrous oxides presenting in the oxidizing slag and the converter refractory lining, and thereby to reduce converter lining wear. The problem of lowering the degree of slag oxidation is solved by removing the slag from the surface of the bath and by subsequent deoxidizing the metal bath with addition of solid iron and a supplemental quantity of the solid carbon-containing fuel.

The implementation of the present invention permits shotening of the duration of the melting process approximately by 10% and decrease converter lining wear approximately by 30-35%.

EXAMPLE 1

A 10-t converter equipped with bottom and side fuel oxygen tuyeres as well as with a top water-cooled oxygen lance was loaded with 0.5 t of lime and 10 t of metal scrap. The scrap was heated by enriched air containing 50% of oxygen and 5-8 $m^3$/min of natural gas injected through the bottom tuyeres. Through the side tuyeres oxygen in an amount of 5-10 $m^3$/min was injected. Consumption of oxygen injected through the top lance was changed in the range of 10-15 $m^3$/min.

Melting the charge was done in the same way as its heating, i.e. consumption of gas components supplied into the converter in the process of melting was the same as for heating. Besides, instead of enriched air through the bottom tuyeres oxygen was injected in an amount of 10-15 $m^3$/min During heating and melting 400 kg of coal was loaded into the converter in parts of 100 kg. By the moment when the charge was melted the slag contained 30% of ferrous oxide and 4% of magnesium oxide. The solid charge got melted in 30.5 minutes. Temperature was 1525° C. The oxidized slag in the amount of 0.5 t was removed (pumped out) from the converter. After blowing was restarted again (through the bottom tuyeres it was injected 15-20 $m^3$/min of oxygen and 2.5-3.0 $m^3$/min of natural gas, through the side tuyeres it was injected 5 $m^3$/min of oxygen and 2 $m^3$/min of natural gas, through the upper lance it was injected 10-15 $m^3$/min of oxygen) 200 kg of solid iron and 500 kg of small size coal were charged successively into the converter. Blowing was continued 7 minutes more. Total net time of blowing was 37.5 minutes. When the blowing was over the temperature of the metal was 1630° C. Metal composition was: 0.07% C; 0.02% Mn; 0.008% P; 0.035% S, iron was the balance. Ferrous oxide content in the final slag was 16.8%, magnezium oxide content was 3.9%.

EXAMPLE 2

A 10-t converter was loaded with 0.5 t of lime and 9.9 t of metal scrap. Blowing conditions were the same as in Example 1. During heating and melting the scrap 450 kg of coal dust was loaded into the converter. By the moment of the charge is melted (32 min) total ferrous oxide content in the slag was 49.2%, magnesium oxide content was 4.3%. Temperature of the bath was 1580° C. 550 kg of the slag was pumped out from the converter and 350 kg of solid iron was charged thereinto. During the further blowing (6 min) 100 kg of coal dust was loaded into the converter. Before steel tapping its composition was: 0.04% C; 0.03% Mn; 0.010% P; 0.027% S, iron being the rest. Ferrous oxide content in the final slag was 18.3% magnesium oxide content was 4.2%, Metal temperature was 1650° C.

EXAMPLE 3

A converter was loaded with 0.5 t of lime and 9.6 t of metal scrap. During heating and melting 300 kg of coal dust was loaded into the converter. By the moment of charge melting (31 min) total ferrous oxide content in the slag was 36.7%, magnesium oxide content was 4.5%. Temperature of the bath was 1550° C. 500 kg of the slag was pumped out from the converter, and 300 kg of solid iron was charged thereinto. During a subsequent blowing (6.5 min) 300 kg of coal dust was loaded into the converter. Before tapping steel comporition was: 0.05% C; 0.02% Mn; 0.008% P and 0.033% S. Ferrous oxide content in the final slag was 15.1%; magnesium oxide content was 4.5. Metal temperature was 1650° C.

Data on examples 1, 2, 3 and other examples specifying the present invention within the applied parameters as well as beyond the applied parameters (examples 4-6) are shown in the table attached. Data specifying the process of steel production from a solid metal charge in a 10-t converter with using a known in the prior art method are also shown for comparison.

TABLE

Main technological parameters of the process of melting steel from solid metal charge in a converter with the use of the present method and the method known in the art

| Nos 1 | 2 | Prior art technique 3 | Example of melting 1 / 4 | 2 / 5 | 3 / 6 | 4 / 7 | 5 / 8 | 6 / 9 |
|---|---|---|---|---|---|---|---|---|
| 1 | Weight of a metal charge to be melted, t | 9.7 | 10.0 | 9.9 | 9.6 | 9.8 | 9.5 | 9.7 |
| 2 | Amount of lime, used, t | 0.5 | 0.5 | 0.5 | 0.5 | 0.5 | 0.5 | 0.5 |

TABLE-continued

Main technological parameters of the process of melting steel from solid metal charge in a converter with the use of the present method and the method known in the art

| Nos 1 | 2 | Prior art technique 3 | Example of melting 1 / 4 | 2 / 5 | 3 / 6 | 4 / 7 | 5 / 8 | 6 / 9 |
|---|---|---|---|---|---|---|---|---|
| 3 | Amount of coal used in the process of heating and melting a solid metal charge, t | 0.70 | 0.40 | 0.45 | 0.30 | 0.30 | 0.30 | 0.45 |
| 4 | Duration of the period of heating and melting a solid metal charge, min-sec | 32-30 | 30-30 | 32-00 | 31-00 | 29-30 | 30-30 | 31-40 |
| 5 | Temperature of the metal at the end of the period of heating and melting, °C. | 1530 | 1525 | 1580 | 1550 | 1555 | 1590 | 1590 |
| 6 | Ferrous oxide (FeO) total content in the slag removed, % | 24.2 | 30.0 | 49.2 | 36.7 | 70.0 | 75.6 | 48.9 |
| 7 | MgO content in the slag removed, % | 8.1 | 4.0 | 4.3 | 4.5 | 4.7 | 5.0 | 4.9 |
| 8 | Amount of slag removed, t | — | 0.50 | 0.55 | 0.50 | 0.60 | 0.60 | 0.55 |
| 9 | Mass of MgO in the slag removed, t | — | 20.0 | 23.6 | 22.5 | 28.2 | 30.0 | 27.0 |
|  | Amount of solid iron added after the slag removal: |  |  |  |  |  |  |  |
| 10 | weight, t | — | 0.20 | 0.35 | 0.30 | 0.50 | 0.10 | 0.53 |
| 11 | % of the scrap weight | — | 2.0 | 3.5 | 3.1 | 5.0 | 1.1 | 5.5 |
| 12 | Amount of coal (pulverized) added: weight, t | — | 0.50 | 0.1 | 0.30 | 0.2 | 0.50 | 0.05 |
| 13 | % of the scrap weight | — | 5.8 | 1.0 | 3.1 | 2.1 | 5.3 | 0.51 |
| 14 | Duration of blowing after slag removal, min-sec | 9-00 | 7-00 | 6-00 | 6-30 | 7-30 | 8-30 | 7-50 |
| 15 | Weight of the final slag, t | 1.75 | 1.35 | 1.40 | 1.30 | 1.35 | 1.35 | 1.30 |
| 16 | Ferrous oxide (FeO) content before tapping, % | 27.4 | 16.8 | 18.3 | 15.1 | 19.7 | 23.7 | 21.2 |
| 17 | MgO content before tapping, % | 6.6 | 3.9 | 4.2 | 4.5 | 4.7 | 5.2 | 5.0 |
| 18 | Mass of MgO in the final slag, kg | 115.5 | 52.6 | 58.8 | 58.5 | 61.1 | 70.2 | 65.0 |
| 19 | Sulphur content in metal before tapping, % | 0.037 | 0.035 | 0.027 | 0.033 | 0.028 | 0.034 | 0.031 |
| 20 | Temperature of metal, °C. before tapping | 1620 | 1630 | 1650 | 1650 | 1630 | 1640 | 1660 |
| 21 | Net time of blowing, min-sec | 41-30 | 37-30 | 38-00 | 37-30 | 37-00 | 40-00 | 40-30 |
| 22 | Total quantity of MgO transferred to the slag, kg | 115.5 | 72.6 | 82.4 | 81.0 | 89.3 | 100.2 | 92.0 |

The comparison shows that the present invention permits reduction of the duration of heating and melting a solid metal charge and reduction of the overall time of blowing approximately by 4 min. Refractory lining wear is reduced by 30-35%.

Thus, the use of the present method permits reduction of the duration of melting and decrease of the refractory lining wear-through slag-forming control and the use of deoxidizing materials.

What is claimed is:

1. A method of production of steel in an oxygen converter from solid metal iron-bearing materials, comprising:

charging iron-bearing materials into the oxygen converter;

heating said iron-bearing materials through their simultaneous burning hydrocarbon and solid carbon-containing fuels in an oxygen-containing gas until a melt is formed;

removal of the oxidizing slag from the surface of said melt when the temperature of said slag is 1525°-1580° C.; and loading a solid iron in an amount of 2-5% of the initial quantity of the solid metal iron-bearing materials into said melt after removal the oxidizing slag from its surface.

2. A method as claimed in claim 1, wherein after charging a solid iron in said melt an additional solid carbon-containing fuel is loaded therein in an amount of 1-5% of the initial quantity of the solid metal iron-bearing materials.

* * * * *